(No Model.)  E. C. SCHROEDER.  6 Sheets—Sheet 2.
POTATO PLANTER.

No. 368,495.  Patented Aug. 16, 1887.

Witnesses:
Albert H. Adams
O. W. Bond

Inventor:
Ernest C. Schroeder (No Model.) 6 Sheets—Sheet 6.

E. C. SCHROEDER.
POTATO PLANTER.

No. 368,495. Patented Aug. 16, 1887.

Witnesses:
Albert H. Adams.
O. W. Bond.

Inventor:
Ernest C. Schroeder.

UNITED STATES PATENT OFFICE.

ERNEST C. SCHROEDER, OF ITASCA, ILLINOIS.

POTATO-PLANTER.

SPECIFICATION forming part of Letters Patent No. 368,495, dated August 16, 1887.

Application filed December 14, 1886. Serial No. 221,578. (No model.)

*To all whom it may concern:*

Be it known that I, ERNEST C. SCHROEDER, residing at Itasca, in the county of Du Page and State of Illinois, and a citizen of the United States, have invented a new and useful Improvement in Potato-Planters, of which the following is a full description, reference being had to the accompanying drawings, in which—

The object of this invention is to construct a machine by means of which one or two rows of potatoes can be planted or dropped one at a time at regular intervals apart; and its nature consists in the several parts and combinations of parts hereinafter described, and pointed out in the claims as new.

In the drawings, A represents the hopper, of a capacity to receive a quantity of potatoes, and having a sliding section, A', in its bottom, which can be opened to allow the potatoes to pass through a spout, A'', and enter the receptacle, from which they are to be taken by the droppers to be planted.

Figure 2:
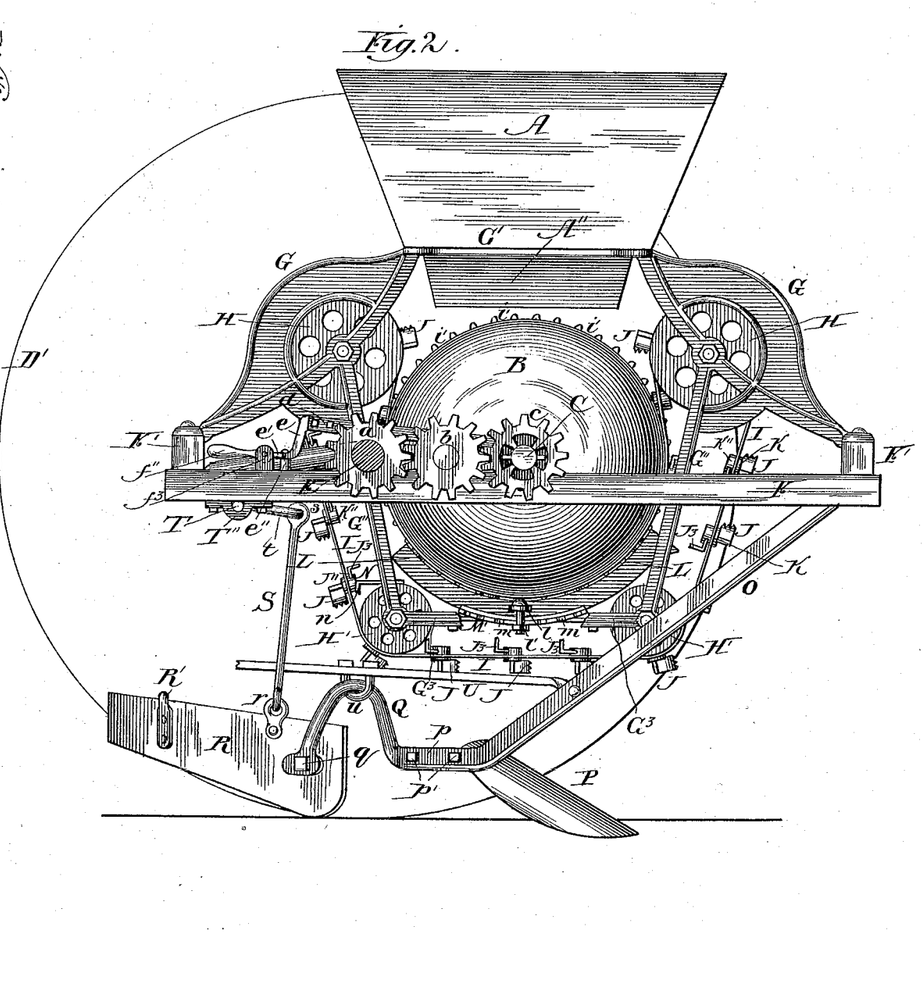
Fig. 2, a side elevation showing the wheel in outline only.
Figure 3:
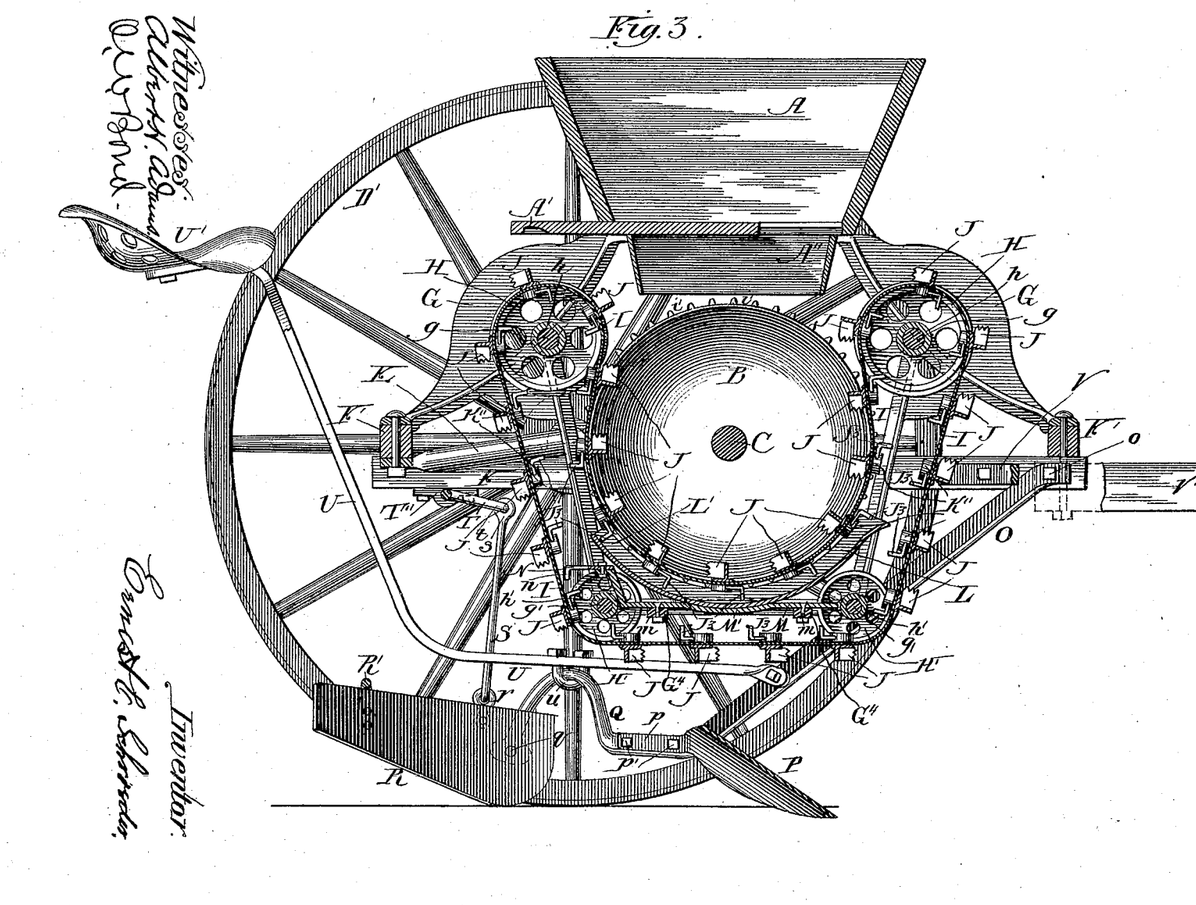
Fig. 3, a central longitudinal section.
Figure 4:
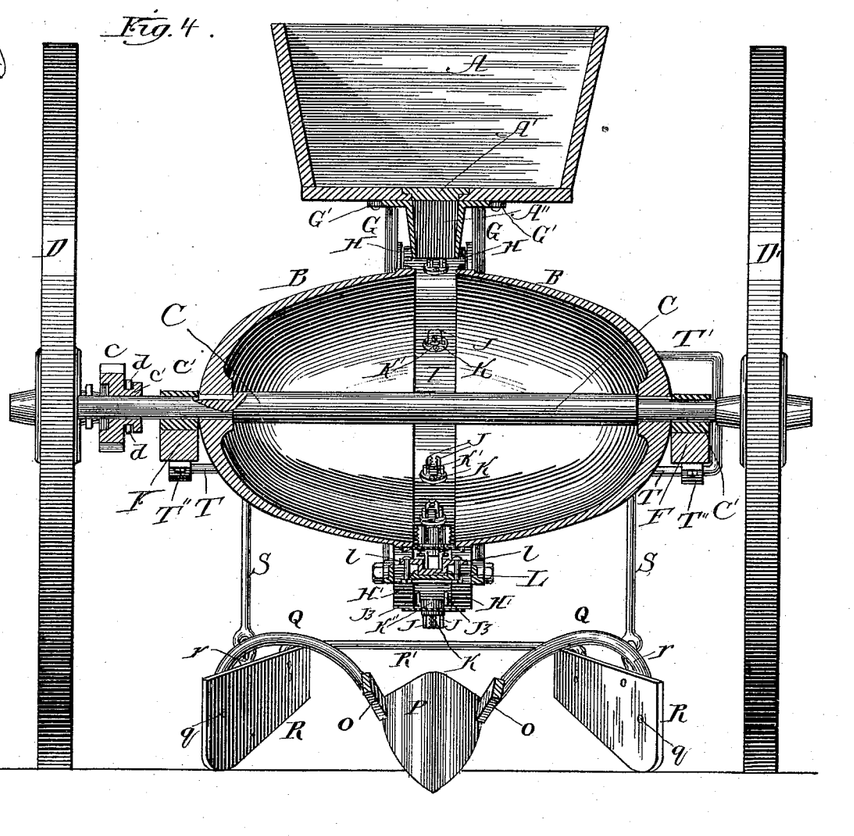
Fig. 4, a central cross-section with the driving-shaft and wheels in elevation.

B B represent the receptacle for the potatoes, formed, as shown in Figs. 1, 2, 3, and 4, of two similar halves or sections, having, as shown, a circular exterior in cross-section, and interior of a spheroidal shape longitudinally, as shown in Fig. 4.

Figure 1:
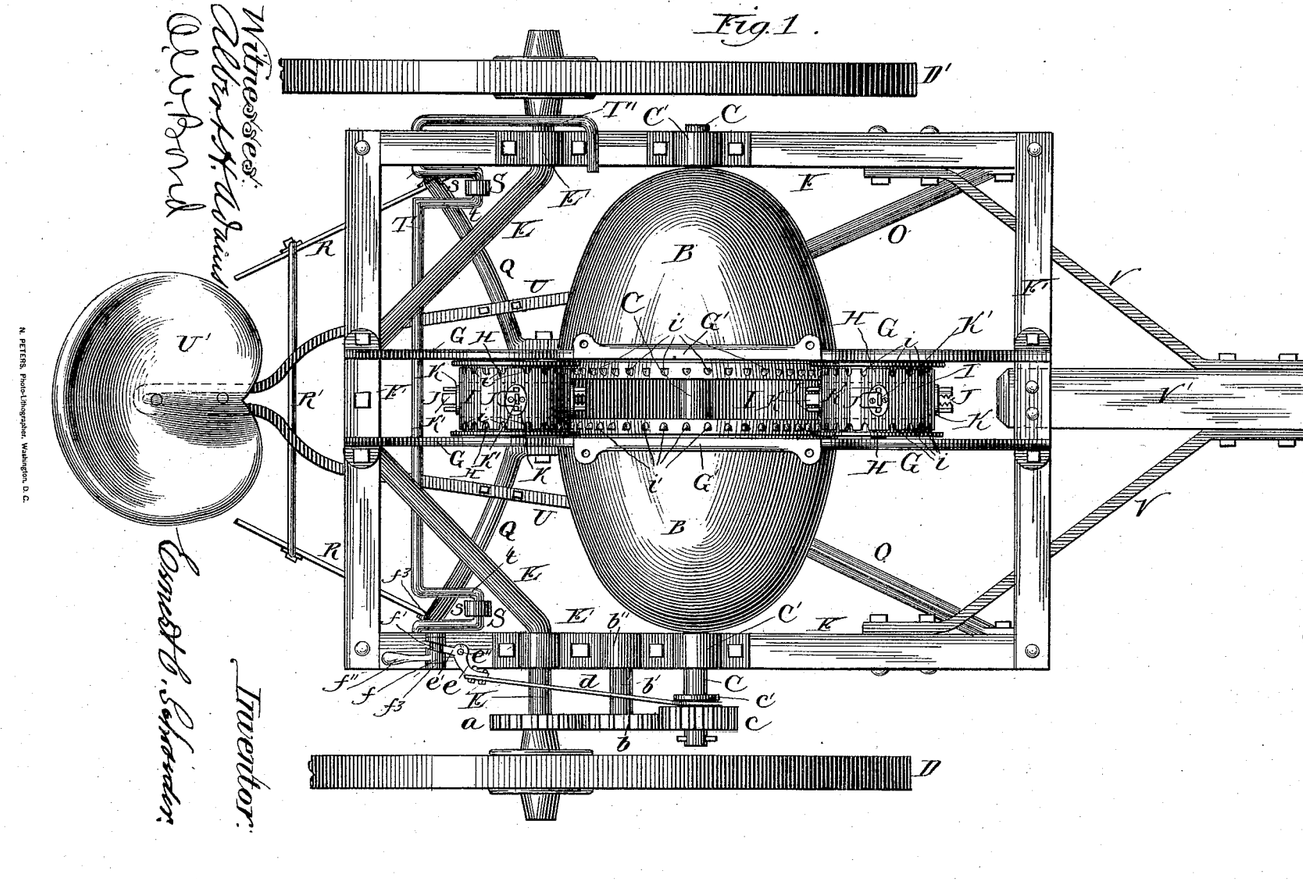
Figure 1 is a top or plan view.

C is the shaft carrying the receptacle B B, the halves or sections of which are mounted on the shaft and secured thereto by keys or otherwise, so as to rotate with this shaft, and the halves or sections are located in relation one to the other as to leave an open space between their inner or open ends, as shown in Figs. 1 and 4, through which the potatoes can be discharged into the receptacle and be taken therefrom one at a time by the carrying-chain and holders.

D D' represent the carrying-wheels, to the hub of one of which, D, is attached a gear, $a$, which meshes with a gear, $b$, on a shaft, $b'$, mounted in a suitable box, $b''$, on the frame of the machine, and this gear $b$ meshes with a gear, $c$, on the end of the shaft C, so that with the travel of the wheel D a rotary motion will be given to the shaft C and receptacle B B. The gear $c$ has on one side a hub, $c'$, with a groove therein to receive the fork of a bar, $d$, the other end of which is connected to an arm, $e$, of a lever, which is mounted on a stud or pin, $e''$, extending up from the frame, and which lever has an arm, $e'$, which enters a cam-groove, $f'$, in a roll, $f$, mounted between uprights $f^3$ on the frame of the machine, and having a handle or lever, $f''$, by which the roll can be turned to cause the cam-groove to act on the arm $e'$ and turn the lever to move the arm $e$ and bar $d$ to shift the pinion $c$ on the shaft C into and out of mesh with the pinion $b$, and thereby produce a rotation of the shaft C, or stop such rotation.

E represents the axles for the spindles, on which the wheels D D' are mounted in any usual manner. As shown, two axles are provided; but a single axle running across the machine could be used, if desired.

F represents the side bars, and F' the end bars, of the frame. The side bars have secured thereto the boxes C', in which the shaft C is supported and rotates, as shown in Fig. 1, and to these side bars is secured the boxes E', which support the axles E at one end, the other end being bolted or otherwise secured to the rear cross-bar F' in the form of construction shown, and to one of the side bars, F, is secured the box $b''$ of the shaft $b$ and the stud $e''$, which carries the shifting-lever for the pinion $c$, and the uprights $f^3$, which carry the cam-grooved roll.

G represents supports attached at the front and rear end to the front and rear cross-bars, F', and extending up and having a flat top portion, G', to receive the hopper A, which is bolted or otherwise secured thereto, and, as shown, the mouth or discharge A'' for the hopper is cast or formed with the top G' of the supports, and, as shown, extending down from each support G. At the front and rear is a bar, G'', the bottoms or lower ends of which are connected by a bar, G³, and the bottom bars, G³, as shown, are connected by cross-bars G⁴.

H represents wheels or pulleys, two at the front and two at the rear of the machine, and mounted on a shaft or rod, $g$, the ends of which are mounted or secured in the supports G, and, as shown, each wheel or pulley H is provided with a hub or center, $h$, for a bearing on the rod $g$, and these wheels or pulleys H are mounted on the shaft or rod $g$, so as to leave a space between their inner or adjacent edges, and the outer edge of each wheel or pulley in the construction shown is provided with a bead or flange to form a guide for the carrying-belt. These wheels or pulleys H are arranged in pairs above and on each side of the receptacle B, and below and on each side of the receptacle B are companion wheels or pulleys H', which are mounted on a rod or shaft, $g'$, the ends of which are mounted or secured at the juncture of the bars G'' G³ in the arrangement shown, and these pulleys each have a hub or center, $h'$, to furnish a bearing on the rod or shaft $g'$, and they are mounted on this rod or shaft so as to leave a space between their inner edges corresponding to the space between the wheels or pulleys H. The arrangement of the wheels or pulleys H H' and their relation to each other and to the receptacle B is shown in Figs. 1, 2, 3, and 4, and these wheels carry the belt which supports the holders by which the potatoes are taken from the receptacle and deposited on the ground.

I is the carrying-belt for the holders, made of a ribbon of steel or other suitable material sufficiently flexible to curve or bend around the receptacle B B and the carrying wheels or pulleys H H', and of a width sufficient to have its edges ride on the wheels or pulleys H H' and the inner edges of the halves or sections of the receptacle, and each edge of this belt is provided with notches or recesses $i$, into which successively teeth or projections $i'$ on the exterior of the halves or sections of the receptacle enter, so that the rotation of the receptacle will drive the belt I and carry the holders successively around and through the receptacle.

J represents the jaws or holders for carrying and depositing the potatoes, each jaw being formed of a plate having its acting end serrated or toothed. Each jaw is attached to a spindle, J', the part of which that receives the jaw, as shown, being square in cross-section and the remaining portion being circular, and extending out from the circular end is an arm, J'', on the end of which is a handle, J³, as shown in Figs. 7, 8, 9, and 10.

Figures 6, 7, 8, 9:
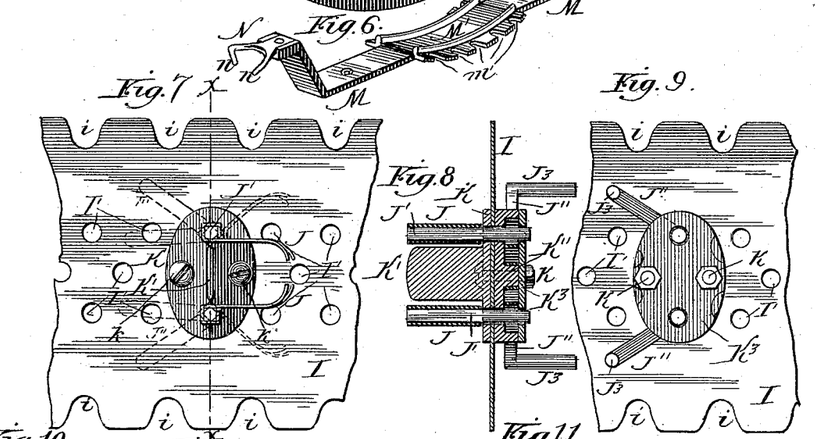
Fig. 6, a detail, being a perspective view of the fork for opening the holders to discharge the potatoes for planting.
Fig. 7, a detail showing a portion of the carrying-belt and one of the holders.
Fig. 8, a section on line $x\ x$ of Fig. 7.
Fig. 9, a detail showing the opposite side of the belt and holder from that shown in Fig. 7.
Figure 10:
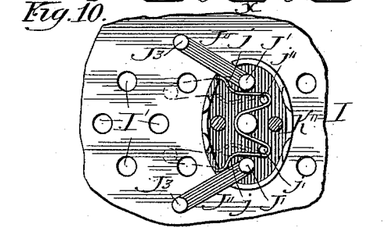
Fig. 10, a detail corresponding to Fig. 9, with the cap-plate removed.

K is a plate, through which the circular portion of the spindle J' passes, and this plate K has a flange or projection, K', extending out therefrom and lying, when the parts are together, between the spindles J' at the base of the jaws or holders J, as shown in Figs. 7 and 8. This plate is located on the outer face of the belt or chain, and on the opposite side and coinciding therewith is a shell, K'', formed of a bottom plate and a rim, through the bottom plate of which the spindles J' pass, and through a slot in the rim of which the arms J'' project, as shown in Fig. 10, and this shell is covered or closed by a cap, K³, through which cap and the bottom plate of the shell and the plate K and belt I bolts $k$ pass for securing the jaws or holders to the belt. The jaws are held closed by the action of the arms $j$ of a spring located in the shell K'', which spring passes around pins or studs $j'$ $j''$, as shown in Fig. 10, so as to have an arm $j$ bear against each arm J'' and hold the jaws closed.

Figure 5:
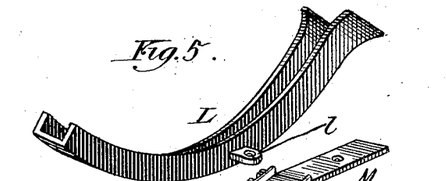
Fig. 5, a detail, being a perspective view of the track for opening the holders to receive the potatoes.

L is a track or guide located below the receptacle B B and in line with the slot or opening between the halves of the receptacle, and formed of a bottom plate and two side plates, as shown in Fig. 5, with the receiving end flaring somewhat to insure the passage of the handles J³ into the space between the side walls of the guide, which walls act on the handles and draw them toward each other, and thereby open the jaws or holders J. This track or guide L is located to act on the handles J³ and hold each jaw open in succession while passing through the receptacle B B, into the interior of which the jaws or holders project, so that while passing through the receptacle a potato will enter between the jaws or holders and be there caught, to be carried by the jaws or holders out from the receptacle and around to the point of discharge.

M is a plate attached to the cross-bars G⁴ by suitable bolts, $m$, or otherwise, and having a curved central portion, M', to receive the track and guide L, which track or guide is held in position by a bolt, $l'$, passing through an ear, $l$, of the track or guide, and into a notch, $m'$, on the edge of the curved portion M', an ear being provided on each side of the track, and notches $m'$ on each side of M', and, as shown, a series of notches, $m'$, is provided, so that the track or guide can be properly adjusted to open the jaws J, after they enter the receptacle B B, and allow them to close and grasp a potato before they pass from the receptacle.

N is a fork attached to the plate M, and having projecting ends or fingers $n$, which strike the handles J³ in the rotation of the belt I and open the jaws J and allow the caught potato to drop, for which purpose the fork N is located as shown in Figs. 2 and 3.

O represents bars, each pivoted at its forward end by a bolt or pivot, $o$, to the side bar, F, on each side of the machine; and these bars O extend rearwardly in a diagonal direction to have their rear ends on each side of the drop of the machine, and, as shown, the extreme rear end of each bar O is carried back and up to form a curved portion or goose-neck, Q.

P is a plow for opening the furrow to receive the potatoes, and having on each side a shank, *p*, through which and the bar O bolts *p'* are passed for attaching the plow in position.

R represents the coverers, one for each side of the furrow, and attached by a bolt, *q*, to the goose-neck Q, so as to stand in a diagonal direction to carry the earth inward and cover the potatoes when dropped, and, as shown, the rear ends of these coverers are connected by a cross-rod, R', so as to give them the proper stiffness at that point.

S represents supporting-rods, one for each coverer R, and connected to the coverer by an eye, *r*.

T is a crank-shaft having two cranks, *t*, one for each rod S, and to which crank the rod is connected by an eye, *s*, in the arrangement shown. The crank-rod T is mounted in boxes T'', attached to the under face of the side pieces, F, and at one end this crank-rod is extended to form a foot treadle or lever, T', by means of which the cranks *t* can be raised or lowered to raise and lower the coverers through the connecting-rods S.

U represents bars attached at their forward ends by a bolt to the bars O, and connected with the goose-neck Q by a stirrup, *u*, and the rear end of this bar U extends upward and carries a seat, U'.

V represents brace-bars, one for each side of the frame, and attached to the side pieces of the frame by bolts or otherwise, and extending forward, and having their front ends bolted or otherwise secured to a tongue, V'.

The operation is as follows: The hopper A is to be be filled with potatoes, and the receptacle B B is filled by withdrawing the slide A' and allowing the potatoes to pass from the hopper through the mouth or discharge A'' until the receptacle is filled to the extent desired, when the further discharge is stopped by closing the slide A'. The machine is drawn over the field to be planted by a team attached to the front end in any usual and well-known manner, and the movement of the machine in going over the field, through the gear *a* on the hub of the wheel D driving the gear *b*, which, through the gear *c*, when in mesh with the gear *b*, drives the shaft C and rotates the receptacle B B, and the rotation of this receptacle, through the engagement of the teeth or projections *i'* with the notches *i* of the belt I, drives such belt under the receptacle, over the wheels or pulleys H, and under the wheels or pulleys H'. The travel of the belt I brings the jaws or holders J J in succession around to enter the space or slot between the halves of the receptacle B B and pass out therefrom, and after a jaw has entered the receptacle the handles J³ thereof are engaged by the side walls of the track or guide L and brought toward each other, which opens the jaws or holders J a sufficient distance for a potato to pass between them, and these jaws are held open by the track or guide L until the terminal point of the track or guide is reached, which point, as shown, is that where the jaws begin their upward movement, and at which point the release of the handles J³ from the track or guide allows the arms *j* of the spring to act and close the jaws or holder, grasping the potato between the jaws firmly, and as these jaws are closed before the final point of exit is reached it will be seen that in case a potato is caught outside of the jaws it will fall back into the receptacle as the jaws reach a point where it passes from the receptacle, while the potato caught by the jaws will be carried thereby out of the receptacle, around over the rear wheels or pulleys, H, and down until the handles J³ reach the fork N and are caught by the ends *n*, which move them toward each other, opening the jaw and allowing the potato to drop, and this dropping-point is just back of the plow and forward of the coverers, so that the potato will enter the furrow made by the plow P and be covered by the action of the coverers R. Each jaw or holder in passing through the receptacle will grasp a potato and will carry it out and around to the point of discharge until the field has been planted, and the distance apart at which the potatoes are dropped can be regulated by removing a part of or adding to the number of droppers, and for this purpose the belt I is provided with holes I', arranged in series at regular distances apart, so that the droppers as a whole can be removed so as to leave a greater space between them and there by increase the space between the drops, or a greater number of droppers can be used, making a less space between them, and a corresponding less space between the drops.

Figure 14:
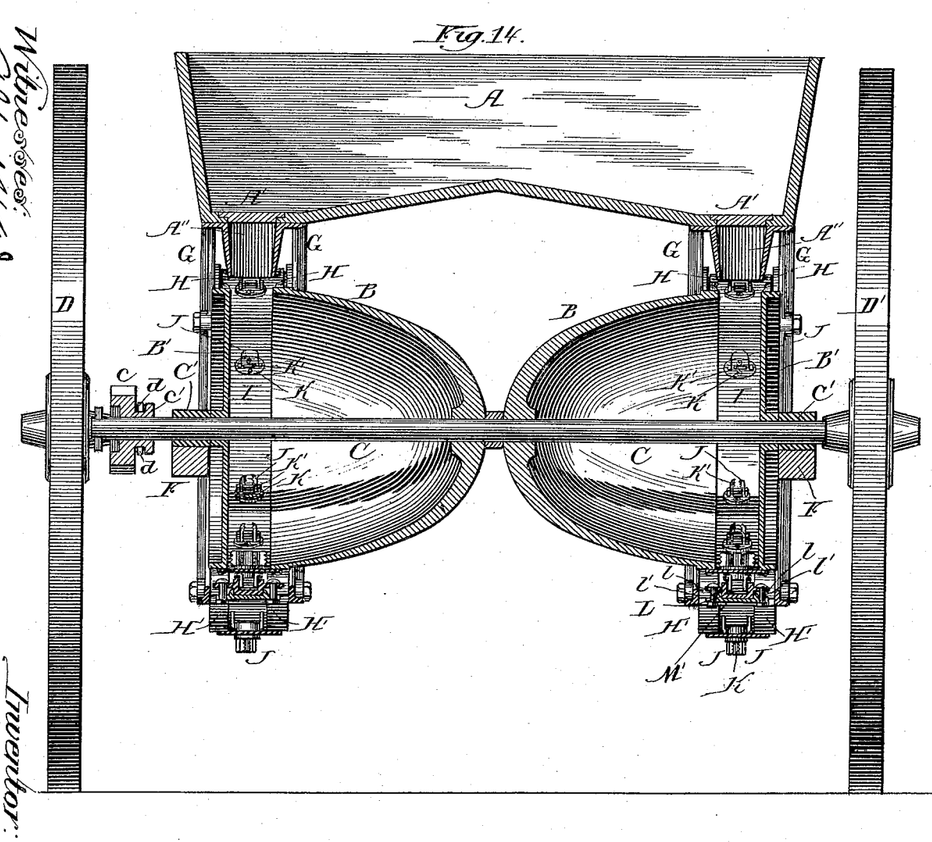
Fig. 14, a cross-section through the machine, showing the devices arranged for planting two rows.

The construction shown in Figs. 1, 2, 3, and 4 is for a single line of drop; but the machine can be used for two lines of drop by the arrangement shown in Fig. 14, in which the sections are turned end for end, and a secondary end plate, B', is used to form the space for the travel of the jaws and the filling of the receptacles with potatoes and their removal therefrom, and with this form of construction two belts I are required, one for each receptacle B, and each carrying the jaws or holders, as already described. The hopper A, with this construction, is provided with a discharge at each end corresponding to the single discharge for the single drop, and as two dropping-belts are employed, a track or guide, L, for each belt is required, as is also a discharging-fork, N, and the frame or supports G G' G'' G³ G⁴ are duplicated, one for each side of the machine, so that it will be seen that by merely turning the sections end to end and duplicating the other parts a double drop instead of a single is provided.

Figure 11:
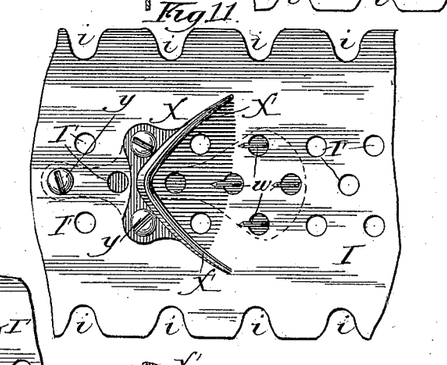
Figs. 11, 12, and 13, details showing a modification in the construction of the potato-holder.
Figure 12:
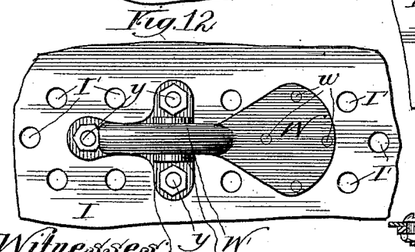
Figure 13:
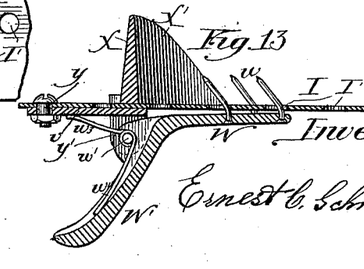

The form of jaws or holders shown in Figs. 7, 8, 9, and 10, and also in Figs. 1, 2, 3, 4, and 14, can be replaced by other constructions, and another form of holder is shown in Figs. 11, 12, and 13, in which a plate, W, having a handle or extension, W', is employed in connection with a jaw, X. The plate W is provided with a series of pins, $w$, which pass through the openings I' and enter the potato, and this plate is pivoted by a suitable pin or pivot, $w'$, between depending ears $y'$ of a plate, Y, attached to the belt I, by a bolt, $y$, and around the pin $w'$ is a coiled spring, one arm, $w''$, of which engages the face of the handle W', and the other, $w^3$, engages the plate Y, so that the arm $w''$ of the spring will act on the arm W' and throw the plate W toward the belt I, projecting the pins $w$ through the holes I' in the belt. The pins $w$ enter a potato and grasp it between them and the flanges X' of the jaw or holder X, where it is caught and held until the pins $w$ are released by the contact of the handle or arm W' with the fork N.

The operation of this jaw is as follows: The handle W' engages the bottom of the track or guide L, and is carried by such engagement toward the face of the belt I, withdrawing the pins $w$, so that a potato can be caught by the jaw or holder X and be carried around, and when the end of the handle W' passes from the track or guide L the coiled spring acts and projects the pins $w$ through the belt, catching the potato and retaining it while passing around out from the receptacle B and over the wheels or pulleys H until the fork N is reached, when the handle W' is engaged thereby, withdrawing the pins $w$ from the potato and allowing it to drop in the furrow back of the plow P, to be covered by the coverers R.

The action of the machine in grasping, carrying, and discharging the potatoes is automatic throughout, and the operation of planting will continue automatically so long as the machine is propelled forward and the gears $a\,b\,c$ are engaged, and in case it is desired to stop the operation for any cause it can be readily done by moving the bar $d$ through the lever and cam-roll, which carries the gear $c$ out of mesh with the gear $b$ and stops the rotation of the shaft C and the receptacle B B, and as the belt I is driven from the receptacle it follows that the operation of the belt ceases.

The cone shape of the surface of the interior of the halves or sections B feeds the potatoes toward the center or opening for the travel of the jaws or holders, so that the potatoes will be in the line of travel of the holders to be caught thereby, and the belt I, extending each side of the opening for the jaws or holders in the receiver, forms a guard for the under side of such slot, preventing the potatoes from escaping from the receptacle.

The pulleys or wheels H H' can be replaced each by a single roller having a central circumferential groove of sufficient depth and width for the passage of the holders, and the discharge-mouth for the hopper can be formed with or attached to the bottom of the hopper, and the manner of gearing can be varied so long as the travel of the planter forward rotates the receiver B, and the rotation of this receiver should be slow, in order not to throw the potatoes around so as to injure them or break the jaws or holders.

What I claim as new, and desire to secure by Letters Patent, is as follows:

1. The combination of a hopper for holding the potatoes with a receiver having a rotary motion, and having a circular cone-shaped interior for feeding the potatoes to the line of discharge, substantially as specified.

2. The receiver B, mounted upon a shaft, C, in combination with a train of gear, $a\,b\,c$, and carrying-wheel D for rotating the receiver from the travel of the machine, substantially as and for the purpose specified.

3. The combination, with a receiver, B, having a conical circular-shaped interior, of a traveling belt carrying jaws or holders for grasping the potatoes and dropping them at stated intervals, substantially as specified.

4. A carrying-belt, I, provided with a series of pivoted jaws or holders adapted to be opened and closed, and located at stated intervals apart for receiving and dropping potatoes, substantially as specified.

5. The combination, with a receiver, B, of a traveling belt, I, provided with a series of jaws or holders, and carrying-pulleys H H', for supporting and driving the belt, substantially as and for the purpose specified.

6. The belt I, provided with jaws or holders, and having its edges provided with notches $i$, in combination with a receiver, B, having its exterior provided with teeth $i'$, for driving the belt from the rotation of the receiver, substantially as specified.

7. The belt I, provided with a series of jaws or holders, in combination with a track or guide, L, for opening the jaws or holders to receive and grasp a potato, substantially as specified.

8. The combination, with the receiver B, of the belt I, provided with a series of jaws or holders, and the track or guide L, for opening the jaws or holders while passing through the receiver, substantially as and for the purpose specified.

9. The receiver B and belt I, carrying a series of jaws or holders, in combination with the track or guide L and support M M', for adjusting the relation of the track to the receiver, substantially as and for the purpose specified.

10. The belt I, carrying a series of jaws or holders, in combination with the fork N, for opening the jaws or holders in succession to drop the potatoes, substantially as specified.

11. The receptacle B, in combination with the belt I, carrying a series of jaws or holders, and the fork N, for opening the jaws or holders in succession to drop the caught potato, substantially as specified.

12. The receptacle B and belt I, carrying a series of jaws or holders, in combination with the track L and fork N, for opening the jaws in succession to receive the potatoes and to discharge them, substantially as and for the purposes specified.

13. The hopper A, having a discharge, A'', reservoir B, mounted on the shaft C, carrying-wheels D D', and axles E, in combination with the frame F F', support G G' G'' G³ G⁴, wheels H H', belt I, carrying a series of jaws or holders, track L, and fork N, substantially as and for the purpose specified.

14. A jaw or holder for grasping and holding potatoes, consisting of plates, each attached to a spindle, J', having an arm, J'', a supporting-plate for the spindles, and a spring acting on the arm J'' to close the jaws or holder, substantially as specified.

15. The jaw or holder J, formed of plates, each mounted on a spindle, J', having an arm, J'', in combination with the plate K, having a flange, K', shell K'', cap K³, and spring-arms j, for receiving and grasping a potato, substantially as and for the purposes specified.

ERNEST C. SCHROEDER.

Witnesses:
ALBERT H. ADAMS,
O. W. BOND.